Jan. 27, 1953　　　　　W. C. HACKMAN　　　　　2,627,015
ELECTRIC STEAM GENERATOR AND CLEANER
Filed Aug. 23, 1948　　　　　　　　　　　　　　5 Sheets-Sheet 1

INVENTOR.
William C. Hackman
BY
Lancaster, Allwine & Rommel
Attorneys

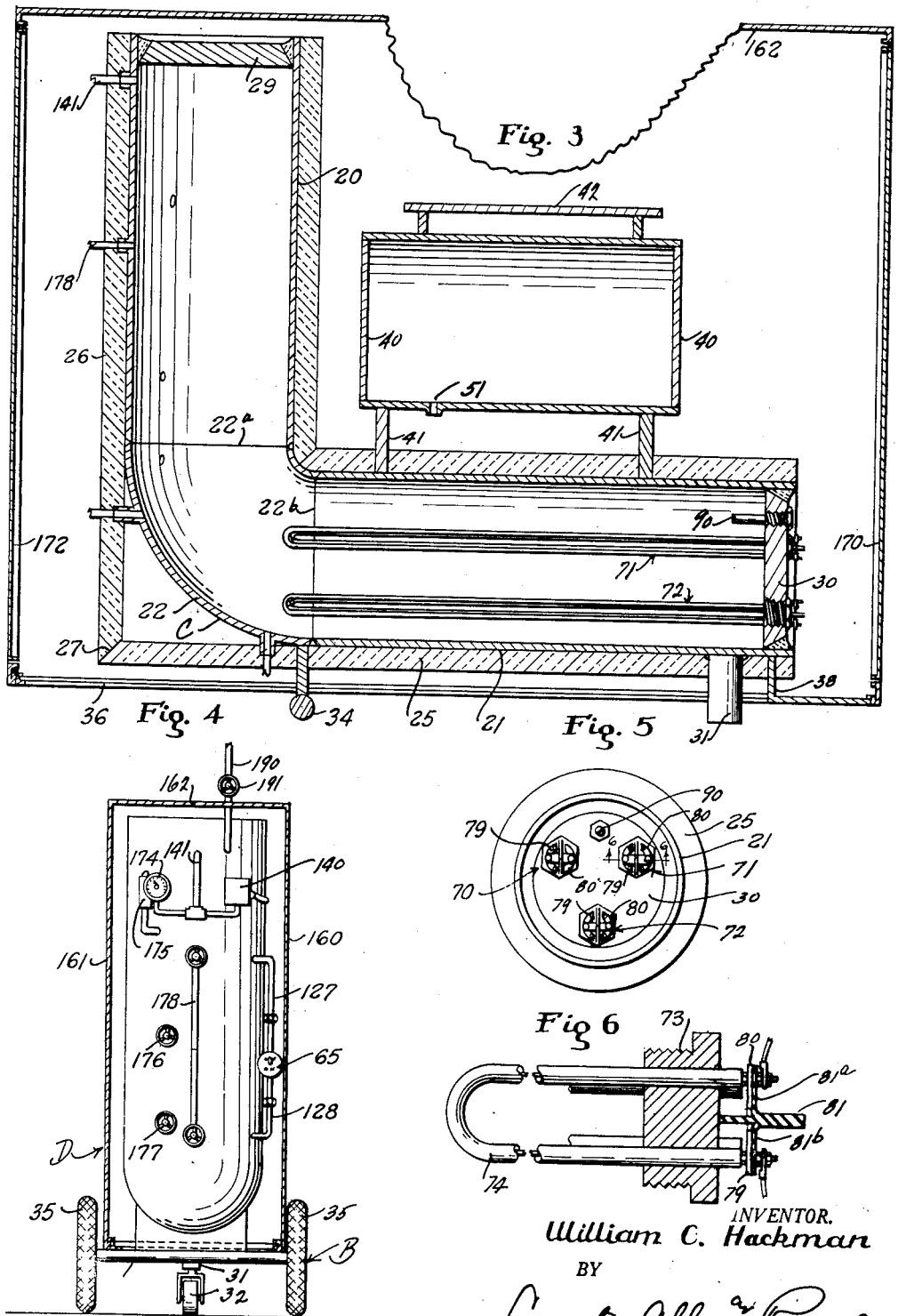

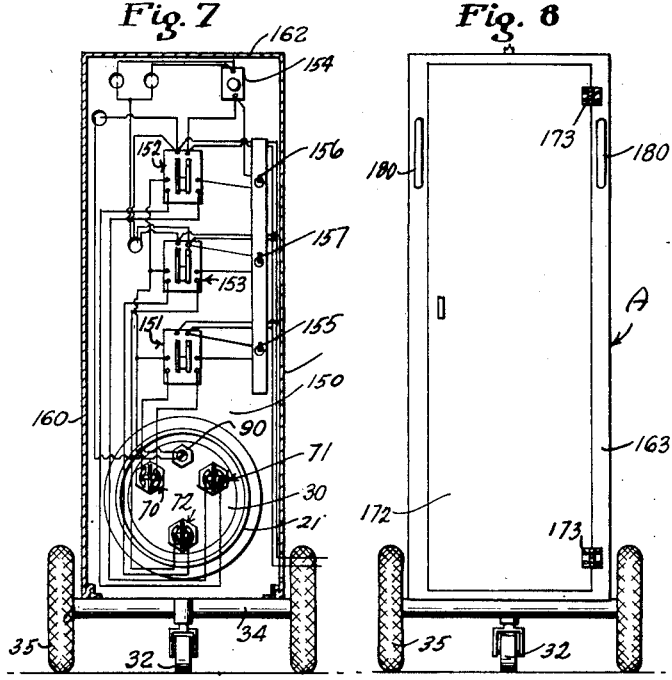

Jan. 27, 1953  W. C. HACKMAN  2,627,015
ELECTRIC STEAM GENERATOR AND CLEANER
Filed Aug. 23, 1948  5 Sheets-Sheet 4

INVENTOR.
William C. Hackman
BY
Sansater, Allen & Rommel
Attorneys

Jan. 27, 1953 W. C. HACKMAN 2,627,015
ELECTRIC STEAM GENERATOR AND CLEANER
Filed Aug. 23, 1948 5 Sheets-Sheet 5

INVENTOR.
William C. Hackman
BY
Sanworth, Allen & Rommel
Attorneys

Patented Jan. 27, 1953

2,627,015

UNITED STATES PATENT OFFICE 2,627,015

ELECTRIC STEAM GENERATOR AND CLEANER

William C. Hackman, Silver Spring, Md., assignor to Electric Steam Cleaner Manufacturing Corporation, Chevy Chase, Md., a corporation of Maryland Application August 23, 1948, Serial No. 45,722

10 Claims. (Cl. 219—39)

This invention relates to improvements in steam generators.

The primary object of this invention is the provision of a compact portable electric steam generator.

A further object of this invention is the provision of an improved type of rapid steam cleaner.

Other objects and advantages of this invention will be apparent during the course of the following detailed description.

In the accompanying drawings, forming a part of this specification and wherein similar reference characters designate corresponding parts thruout the several views—

Figure 3 is a longitudinal cross sectional view taken thru boiler and casing details of the generator.

Figure 4 is a cross sectional view taken substantially on the line 4—4 of Figure 1.

Figure 5 is an end view taken of the head plate of the generator boiler showing the relation of certain heating units.

Figure 6 is a fragmentary sectional view, taken substantially on the line 6—6 of Fig. 5 and showing the construction of a heating unit associated with the boiler.

Figure 7 is a cross sectional view taken thru the generator substantially on the line 7—7 of Figure 1.

Figure 8 is a rear elevation of the generator.

Figure 9 is a front elevation of the generator.

Figure 17 is a side elevation of an improved type of steam cleaner utilizing the generator features of the generator shown in Figure 2; the casing structure being removed.

Figure 1:
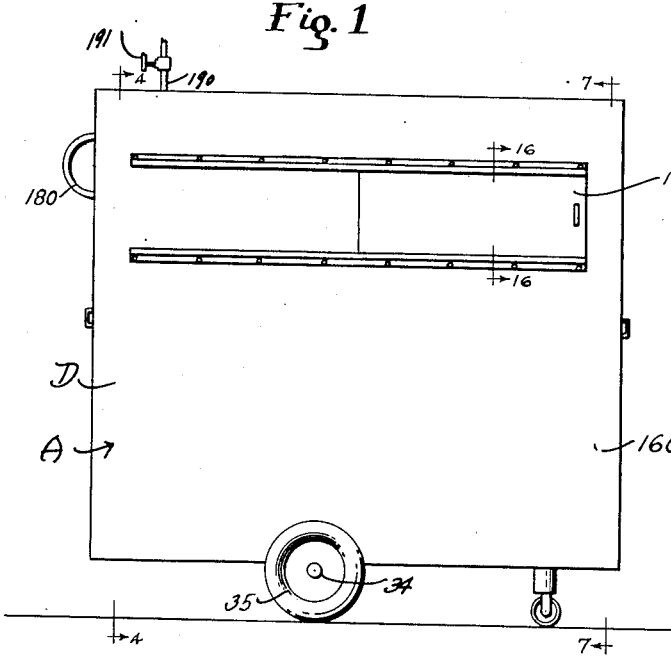
Figure 1 is a side elevation of the improved steam generator.

In the drawings, wherein for the purpose of illustration is shown a preferred form of generator for supplying steam, and a form of steam cleaner, the letter A may generally designate the steam generator. It includes a carriage structure B; boiler arrangement C and casing D for housing the latter. Improved preheating means E is provided for the boiler structure C. The electric heating system F may be wired for two phase or three phase.

The boiler structure C includes the vertical tubular steel portion 20 and horizontal steel tubular portion 21 of the same diameter as the steel portion 20. They are joined by means of a forged steel turn or elbow 22, thus constituting an L-shaped boiler. The joints 22$^a$ and 22$^b$ are welded. The entire boiler structure is encased with sleeve insulation portions 25 and 26 joined at an angle of 45° at 27 and completely enclosing the boiler with the exception of its ends. A top plate 29 is welded in the top of the vertical portion 20 and an end plate 30 is similarly welded in vertical position in the end of the boiler portion 21.

The carriage structure B is intimately associated with the boiler structure and includes a front post 31 welded to the bottom fore portion 21 of the boiler where it supports a caster wheel 32. Just beyond the rear end of the portion 21 and welded to the elbow 22 is a horizontal shaft 34 supporting the wheels 35 at a point just rearwardly of the center of gravity of the equipment. Spaced angle pieces 36 are secured upon and welded to the shaft 34 and forwardly an L-shaped plate 38, which is welded to the boiler, has the angle pieces 36 welded thereto for supporting them in horizontal position.

Figure 2:
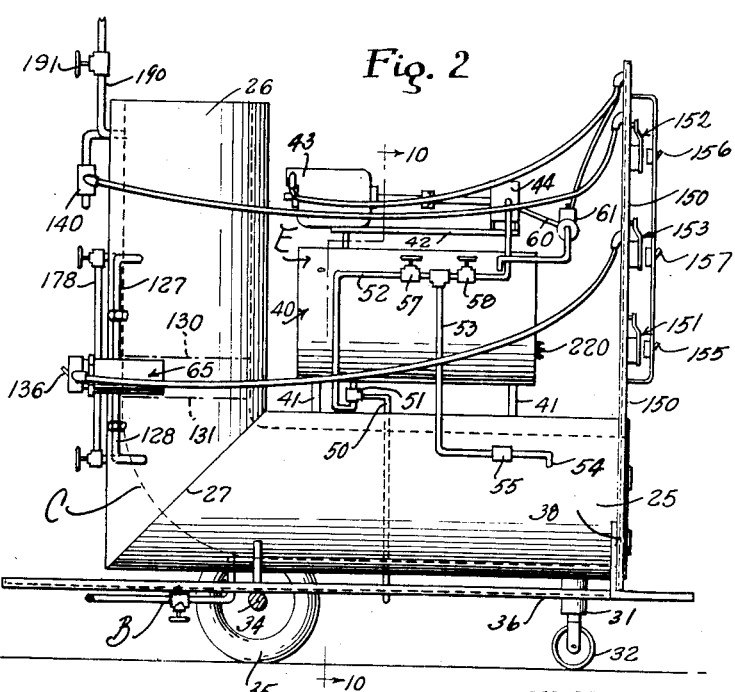
Figure 2 is a side elevation of the steam generator with the outer casing structure removed.
Figure 10:
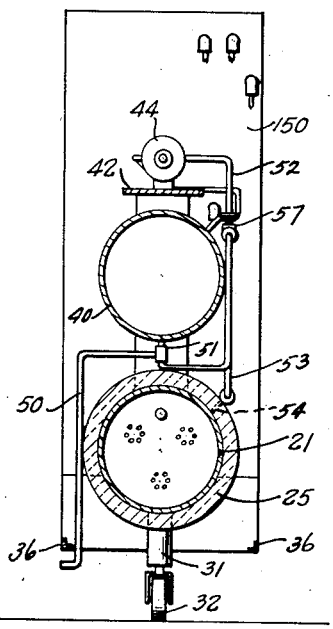
Figure 10 is a cross sectional view taken thru the generator substantially on the line 10—10 of Figure 2.

Referring to the steam generator A as shown in Figures 2, 3 and 10, a preheating tank 40 is welded by legs 41 upon the top of the horizontal portion 21 of the boiler on a horizontal axis. To the top of the preheater tank 40 there is welded a shelf 42 adapted to support an electric motor 43 and a pump 44.

A water inlet line 50 is provided, as shown in Figures 2 and 10, having an entrance 51 to the bottom of the preheating tank 40. The line 50 has connected therewith a pump line 52 which leads to the pump 44. Intermediate the ends of the line 52 there is a line 53 connecting at 54 with the main boiler, as shown in Figures 2 and 10. This line has a check valve 55 therein to prevent back pressure. In the line 52 between the connection of the line 55 and the preheater connection 51 there is a valve 57 and in the line 52 between the connection of the line 53 and the entrance of the line 52 to the pump 44 there is a valve 58. A line 60 leads from the preheater to the pump 44 and in this line is positioned a solenoid operated valve 61.

Water under pressure enters thru the line 50 and may enter directly into the preheating tank 40 at 51 or it may be by-passed to the main boiler at 54.

The solenoid valve 61 is operated by an improved type of thermostatically operated water level control designated at 65 in the drawings. It also operates the motor 43 for the pump 44. Setting the motor 43 in operation will, of course, operate the pump 44 and pump water out of the preheating tank 42 through the line 60 into the line 52, past open valve 58 and into the main boiler thru line 53 at the point 54. Of course under these circumstances the valve 57 will be closed.

Figure 12:
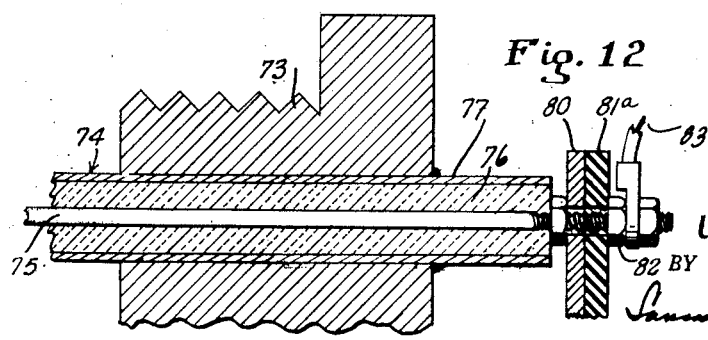
Figure 12 is an enlarged cross sectional view showing the plug mounting of a conductor of one of the heating units.
Figure 13:
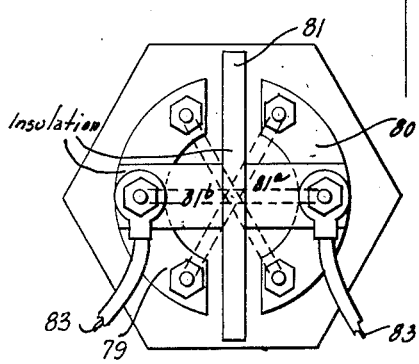
Figure 13 is an end view of one electrical heating unit of the generator.

Referring to the heating equipment, I provide three heating units 70, 71 and 72 as shown at Figure 7. They are supported upon the boiler end plate 30. Each of these heating units 70, 71 and 72 includes a supporting plug 73 which is screw threaded in the plate 30. Three U-shaped heating wires or conductors 74 are supported by each of the plugs 73. These conductors 74 are of the general form shown in Figures 3, 6 and 12. Each includes a conductor wire 75 embedded at its ends in insulation 76 surrounded by an external steel jacket 77; the latter being welded at 78 to the plug 73 and supporting the conductors in a lengthwise position within the horizontal portion 21 of the boiler. One end of each wire 74 is secured as by bolting to an arcuate contact bar 79 (see Figure 13) and the other ends are secured to a similar contact bar 80. To prevent arcing an insulation separator 81 is provided between the contact bars 79 and 80, having portions 81ᵃ and 81ᵇ bolted as at 82 to the threaded ends of the conductor wires 75. Of course lead-off wires 83 are also bolted at this point for connection in the wiring system.

Upon the boiler end plate 30 there is also positioned a conventional low water cutoff thermostat 90, as shown in Figure 3.

Figure 11:
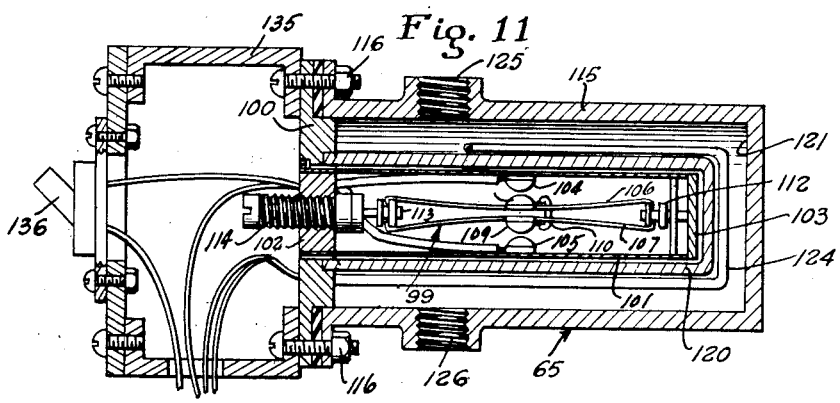
Figure 11 is an enlarged longitudinal cross sectional view taken thru an improved type of thermostatic water level control for the boiler.

An improved type of thermostatically operated water level control designated at 65, and shown in detail in Figure 11 includes a supporting frame or plate 100 having centrally mounted thereon in right angled relation a horizontally positioned thermo-responsive shell 101 of drawn brass which houses the circuit making and breaking mechanism. The shell 101 has sealed ends 102 and 103. In the compartment of this shell are disposed contact points 104 and 105 insulated from the shell at diametrically opposed points. Lead wires extend therefrom thru the end wall 102. The switch mechanism furthermore includes a pair of curved members 106 and 107 of thermally inert metal, such as Invar, which has a low coefficient of expansion. They are of the leaf spring type and bowed, with their convex sides in facing relation. Upon their concaved sides they are respectively provided with contacts 108 and 109 facing the contacts 104 and 105 in complementary relation. The contacts 108 and 109 are electrically connected by a wire 110, as shown in Figure 1. The inner ends of the supporting members 106 and 107 are connected to an anchor pin structure 112 and the outer ends are similarly connected to an anchor pin structure 113 positioned upon a temperature adjusting sleeve or screw 114 which is threaded in the end wall 102, as shown in Figure 11.

The improved water level control mechanism 65 furthermore includes a water level casing 115 bolted in sealed relation at 116 to the plate 100 and housing the switch therein. The thermo-responsive shell 101 is water sealed within a casing 120 within the compartment 121 of the water circulating casing 115. This casing 120 is heat conductive and may be welded to the wall 100. An electrical resistance heating element 124 is supported upon the wall 100 lying close to and externally surrounding the casing 120 within the compartment 121.

The water circulating casing 115 is provided with upper and lower internally screw threaded openings 125 and 126 opening into the compartment 121, with which are respectively connected upper and lower pipes 127 and 128 which open into the boiler at the points indicated in Figures 2 and 4 of the drawings, respectively above and below the normal level of water in the boiler. The dot and dash line 130, shown in Figures 2 and 17 indicates the top water level and the dot and dash line 131 indicates the low or bottom water level, and between these extremes lies the horizontally positioned thermostatic switch construction 65, which in the present instance is designed for the purpose of water level control. Due to the line connections at 127 and 128 water will enter the compartment 121 and assume the same level as in the boiler.

Upon the outer side of the plate 100 there is provided a wire housing and switch box 135 which has a hand operated switch 136 externally mounted thereon, and arranged in the wiring system for by-passing the thermostatic switch 65 in the event the latter is inoperative or not desired to be used, so that the motor and pump may still be operated.

A conventional pressurestat controlled switch 140 has pipe connection at 141 with the boiler, as shown in Figures 2 and 4 of the drawings, for the purpose of opening the circuits to the heating units in the event of too great steam pressure build-up in the boiler.

The electric system furthermore includes a panel board 150 secured on the boiler and carriage frame at the front end thereof, as shown in Figures 2 and 17, which is provided with double pole solenoid operated switches 151, 152 and 153 for the heating units 70, 71 and 72 respectively. This panel also supports a conventional fuse structure 154 and toggle switches 155, 156 and 157 for control of the circuit through the solenoids of the switches 151, 152 and 153 respectively.

Referring to the casing structure D, the same includes right and left side walls 160 and 161, a top wall 162, rear end wall 163 and front end wall 164. These walls define a compartment which houses the boiler, preheater, motor, pump and other details of the wiring system and pipe line system. The casing is of narrow rectangular construction and is mounted upon the carriage supporting angles 36, as by being screwed, welded or otherwise attached thereto.

The casing structure front wall 164 is provided with a closure 170 hinged at 171 which may be thrown open to expose the entire panel board 150 and its details. The rear wall 163 is provided with a similar closure 172 hinged at 173 and adapted to expose the pressure gauge 174, safety valve 175, try cocks 176 and 177 and glass gauge 178, as well as the pressurestat switch 140 and water level control details, all located at the rear end of the boiler, as shown in Figure 4. The wall 163 is provided with handles 180 with which the entire steam generator may be pulled or pushed, or tilted upon the rear wheels for transportation.

As shown in Figure 2, the boiler has a steam outlet 190 with a valve control 191.

Figure 16:
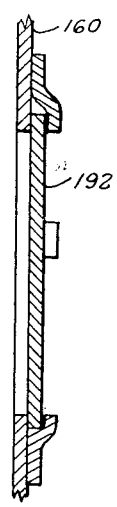
Figure 16 is an enlarged cross sectional view showing a slide closure as a part of the casing; the section being taken on the line 16—16 of Figure 1.

For convenient access to valves, motor and pump the right hand side wall 190 is provided with a slide closure 192, as shown in Figures 1 and 16.

Figure 18:
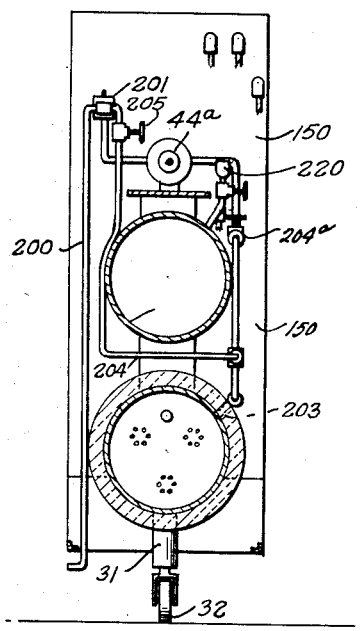
Figure 18 is a cross sectional view taken substantially on the line 18—18 of Figure 17.

Figures 17 and 18 show the steam generator, when used as a cleaner with soap or detergents. In this form of invention the tank 40ª is intended to contain soap or detergent or other cleaner in solution and associated with it is a motor 43ª and a pump 44ª much in the same manner as that above described for the generator A. Water enters line 200 and passes through solenoid valve 201, which also may be a hand operated valve if so desired, and thence enters the pump 44ª and is forced through line 202 to the boiler at 203. The line 202 has a valve 204ª therein. Hand filling of the boiler when there is no pressure therein may take place through line 204 which has a valve 205 therein. Steam pressure for the soap or detergent tank 40ª comes from a line 206 leading off of the main steam line 207. The cleaning fluid under steam pressure comes out of the detergent tank through line 208 and enters the line 207 at 210. A valve 211 is positioned in the line 207 and control valves are also positioned in lines 206 and 208 as shown in Figure 17.

Whenever similar reference characters are used in the forms showing the steam generator of Figure 2 and the steam cleaner of Figures 17 and 18, such designate corresponding parts.

Figure 14:
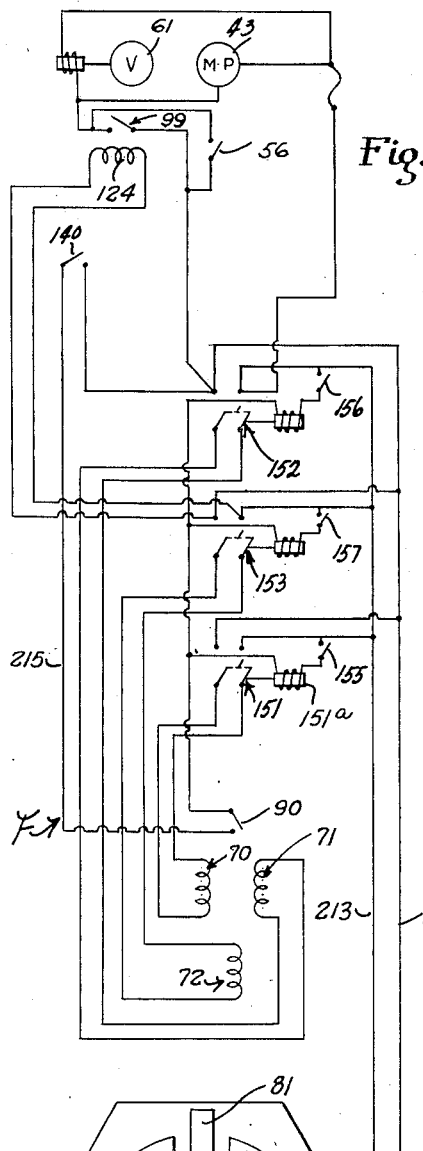
Figure 14 is a wiring diagram for two phase wiring associated with the generator.
Figure 15:
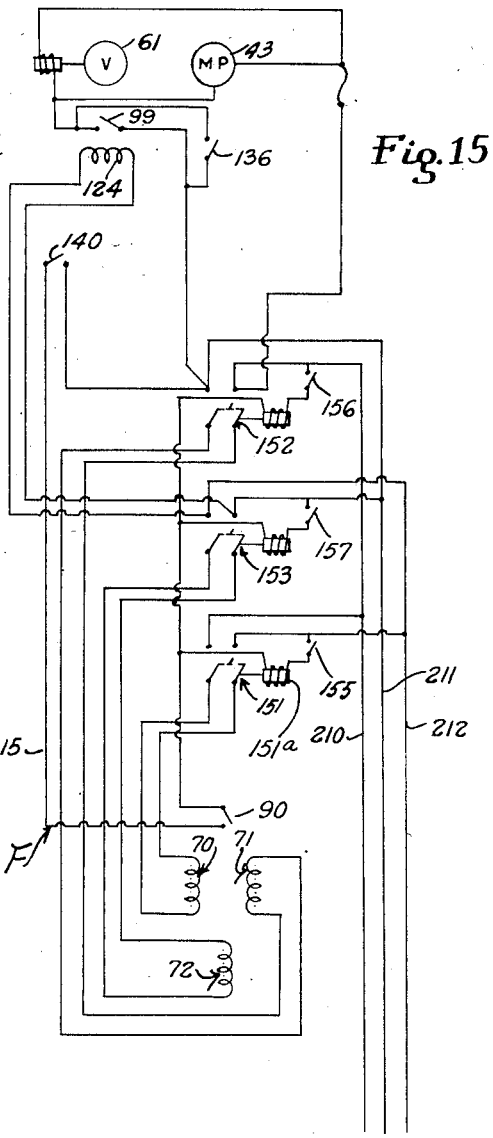
Figure 15 is a wiring diagram for three phase wiring associated with the generator.

The wiring diagrams Figures 14 and 15, respectively designate two and three phase systems, and the only difference resides in the fact that in Figure 15 the three phase system is hooked up with three line wires 210, 211 and 212, and the two phase system of Figure 14 has main lines 213 and 214. They may be suitably connected with a plug (not shown).

The three solenoid switches and the three heating units therefor may be operated independently by means of switches 155, 156 and 157. Circuits may be similarly traced through each of these. Assuming switch 155 to be manually closed, the circuit will pass through the line 213 across the switch 155 and the coil of the solenoid 151ª for the double pole switch 151 thence travel through the thermostatic switch 90 and upwardly through line 215 across the pressurestat switch 140 and return to the line 214. Solenoid 151ª having been energized, such will close the double pole switch 151. Current will then flow through the line 213 down through the double pole switch and through the heating unit 70 and thence return to switch and line 214. The other heating units are similarly controlled through closing of the switches 156 and 157.

The safeguards of the system are quite apparent from the foregoing. It should be noted that as soon as the current is plugged into line circuit through the lines 213 and 214 the resistance unit 124 of the water level control switch 65 will heat. Should the water in the boiler be low, and drop to or adjacent the level 131, the heat from the resistance unit 124 of the water level control 65 will expand the thermo-responsive shell 101 and close the switch 99. This will direct the current thru the motor 43ª and set the pump 44 in operation. Of course the solenoid controlled valve 61 will also be opened and water will be pumped into the boiler to replenish the supply, as above designated. In the event it is not desired to use the water level control switch 99 a hand operated control switch 136 may be used directly or for emergency purposes.

The switch 90, of course, operates as a cutoff; the same being located above the heating units 70, 71 and 72, as shown in Figure 3, so that the circuit will be opened before the water drops to the level of the heating units.

If desired, the pheheater tank may have a separate heating unit, designated at 220 in Figure 2, which may be manually operated before setting the generator into operation. This will preheat the water in the preheating tank 40 to about 190° F. although I do not wish to be restricted to the temperature.

It can be seen from the above that there are three ways to fill the boiler:

(1) By hand switch 136 if there is no pressure in the boiler;

(2) By city water pressure thru the line 50 at 51;

(3) Automatically through the water level control 65.

Under the filling methods 1 and 3 the water may be preheated, as is quite obvious.

The low water cutoff 90 will not only cut off the heating units at low water level but if the water level control 65 fails, low water level cutoff 90 will also cut off the circuit due to rising temperature of water as an incident of increased boiler pressure.

The cleaning material is fed into the tank 40ª through a filler device 220.

Various changes in the shape, size and arrangement of parts may be made to the form of invention herein shown and described without departing from the spirit of the invention or the scope of the following claims.

I claim:

1. In a steam generator the combination of a boiler, water supply means for the boiler, a pump, a motor for operating the pump, an electric circuit connected with said motor, an electrically operated valve connected with said water supply means and operatively connected in said circuit, water level controlled switch means associated with the boiler and disposed in said circuit for controlling said electrically operated valve and motor, and by-passing switch means in said electrical circuit for operating the electrically operated valve and motor independent of said water level controlled switch means.

2. In a steam generator and combination of a boiler, a plurality of heating units for the boiler, a pump for supplying water to the boiler having a pipe line connecting the same with the boiler, a motor for operating the pump, a normally closed electrically operated water supply valve in said line between the pump and boiler, an electric circuit having said electric valve operatively connected therein, a water level controlled switch associated with said boiler and disposed in said circuit for opening said valve, a plurality of electrically operated switches in the electric circuit for selective control of said heating units, and manually controlled switch means for selectively closing the circuit through said electrically operated switches.

3. In a steam generator the combination of a boiler, a plurality of heating units for the boiler, a pump for supplying water to the boiler having a pipe line connecting the same with the boiler, a motor for operating the pump, a normally closed electrically operated valve in said line between the pump and boiler, an electric circuit having said electric valve operatively connected therein, a water level controlled switch associated with said boiler for opening said valve, a plurality of electrically operated switches in the electric circuit for selective control of said heating units, manually controlled switch means for selectively closing the circuit through said electrically operated switches, and a low water cutout thermostat switch connected in the electric circuit for cutting out all of the heating units from said electric circuit at predetermined low water.

4. In a steam generator the combination of a boiler, a plurality of heating units for the boiler, a pump for supplying water to the boiler having a pipe line connecting the same with the boiler, a motor for operating the pump, an electrically operated valve in said line between the pump and boiler, an electric circuit having said electric valve operatively connected therein, a water level controlled switch associated with said boiler for opening said valve, a plurality of electrically operated switches in the electric circuit for selective control of said heating units, manually controlled switch means for selectively closing the circuit through said electrically operated switches, and a pressurestat switch in said electric circuit for cutting out all of said heating units at predetermined high steam pressure in the boiler.

5. In a steam generator the combination of a boiler, a plurality of electrical heating units mounted upon the boiler for heating water therein, independent solenoid actuated switch means for each of the heating units, an electric circuit having said heating units and solenoid actuated switches disposed therein, manually operated switches in said circuit for selectively controlling each of the solenoid actuated switches, a pressurestat actuated switch means in said circuit for simultaneously controlling all of said heating units, and water level controlled switch means in the boiler operatively connected in said circuit for simultaneously controlling all of said heating units.

6. In a steam generator the combination of a boiler, a plurality of electrical heating units mounted upon the boiler for heating water therein, independent solenoid actuated switches for each of the heating units, an electric circuit having said heating units and solenoid actuated switches disposed therein, manually operated switches in said circuit for each of the solenoid actuated switches, a pressurestat actuated switch means in said circuit for simultaneously controlling all of said heating units, water level controlled switch means in the boiler operatively connected in said circuit for simultaneously controlling all of said heating units, a water supply means for the boiler including a motor actuated pump, and a normally closed solenoid actuated valve in said circuit for opening the supply of water thru said water supply means.

7. In a steam generator the combination of a boiler, a water filling line connected with said boiler, motor actuated pump means connected with the water line for pumping water to the boiler, a normally closed electrically operated valve means in said water line between the pump and boiler for controlling admission of water to the boiler, water level control means in the boiler for operating said electrically operated valve means, electric heating means for heating the water in the boiler, a pressurestat connected with the boiler for controlling the heating means, water level control means connected with the boiler for controlling the heating means, a liquid tank, means for admission of steam from the boiler to said tank, a steam discharge line leading off from the boiler, and means connecting said tank with the steam line for intermingling of the liquid from the tank with the steam of the discharge line.

8. In a steam generator the combination of a boiler, a plurality of electrical heating units mounted in the boiler for heating the water therein, electromagnetically controlled switches for each of the heating units, an electric circuit having said heating units and said switches disposed therein, manually controlled switches in said circuit for each unit selectively controlling the flow of current from said circuit thru the respective electromagnetically actuated switches, water level control means in the boiler for controlling the flow of current to said heating units, pressurestat actuated switch means mounted on the boiler for operatively controlling the flow of current to said heating units, water inlet means for the boiler, motor actuated pump means for pumping water thru said water inlet means to the boiler, normally closed electrically actuated valve means in the water inlet means between the pump and the boiler for controlling flow of water from the pump to the boiler, and water level means upon the boiler actuated by the level of water therein with respect to said heating units for opening and closing said electrically actuated valve of the water inlet means.

9. In a steam generator the combination of a steam generating tank, a plurality of independent electrical heating units mounted in the tank for generating steam from water therein, an electric circuit having said heating units connected therein, an electromagnetically controlled switch for each of the heating units disposed in said circuit, a manually controlled switch in said circuit for each of said heating units for selectively controlling the flow of current through the respective electromagnetically operated switches, water level actuated switch means upon the tank for simultaneously controlling the flow of current in said circuit to said heating units, pressurestat actuated switch means upon the tank for simultaneously controlling the flow of current in said circuit to said heating units, water inlet means for the tank, motor actuated pump means for pumping water through the inlet means to the tank, normally closed electromagnetically actuated valve means in the inlet means between the pump and tank for controlling the flow of water from the pump to the tank, water level actuated switch means upon the tank for opening and closing said electromagnetically actuated valve, and manually actuated switch means in said electric circuit bypassing said last mentioned means for closing the circuit through said electromagnetically actuated valve of the water inlet means independent of said last mentioned means.

10. In a steam generator the combination of a boiler, a water filling line connected with said boiler, motor actuated pump means connected with the water line for pumping water to the boiler, a normally closed electrically operated valve means in said water line between the pump and boiler for controlling admission of water to the boiler, electric heating means for heating water in the boiler, water level and pressurestat switch means upon the boiler for controlling the heating means, a liquid detergent tank, means for admission of steam from the boiler to the detergent tank, a steam discharge line leading off from the boiler, means connecting said detergent tank with the steam line for intermingling of the detergent liquid from the tank with the steam of the discharge line, a water level control switch in the circuit for opening the normally closed electrically operated valve means in the water line upon predetermined low water in the boiler, and a bypassing switch means in the electric circuit for maintaining the electric circuit closed for opening the electrically operated valve means independent of the last mentioned water level control switch means.

WILLIAM C. HACKMAN.

REFERENCES CITED

The following references are of record in the file of this patent:

UNITED STATES PATENTS

| Number | Name | Date |
|---|---|---|
| 781,005 | Keyes | Jan. 31, 1905 |
| 1,030,672 | McElroy | June 25, 1912 |
| 1,158,586 | Thornton, Jr. | Nov. 2, 1915 |
| 1,293,216 | Seifert | Feb. 4, 1919 |
| 1,451,847 | Rowe | Apr. 17, 1923 |
| 1,561,480 | Offutt | Nov. 17, 1925 |
| 1,583,961 | Crowell | May 11, 1926 |
| 1,592,113 | Larsen | July 13, 1926 |
| 1,678,995 | Maxim et al. | July 31, 1928 |
| 1,682,448 | Vaughan | Aug. 28, 1928 |
| 1,723,811 | Gumpper | Aug. 6, 1929 |
| 1,787,450 | Lonergan | Jan. 6, 1931 |
| 1,932,447 | Caplan | Oct. 31, 1933 |
| 1,934,826 | Shepherd | Nov. 14, 1933 |
| 2,009,980 | Abbott | July 30, 1935 |
| 2,010,331 | Starrick | Aug. 6, 1935 |
| 2,043,196 | Finlayson | June 2, 1936 |
| 2,060,638 | Schlosser | Nov. 10, 1936 |
| 2,220,353 | Sebo | Nov. 5, 1940 |
| 2,251,630 | Loeffler et al. | Aug. 5, 1941 |
| 2,306,766 | Van Tries | Dec. 29, 1942 |
| 2,344,946 | Landon | Mar. 28, 1944 |
| 2,415,524 | Osterheld | Feb. 11, 1947 |